C. & G. E. SELLERS.

Car Propeller.

8839X

Patented May 22, 1835.

NO PRINTED COPY OF SPECIFICATION IN OFFICE

Charles Sellers & George Sellers of Philadelphia

Letters Patent

Figure 2:
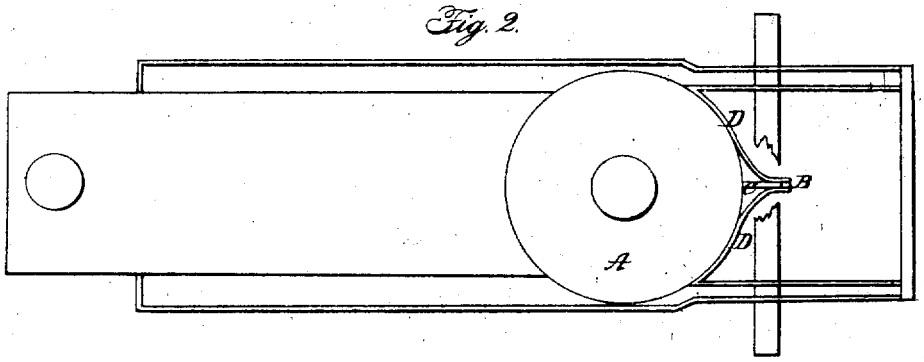
Figure 1:
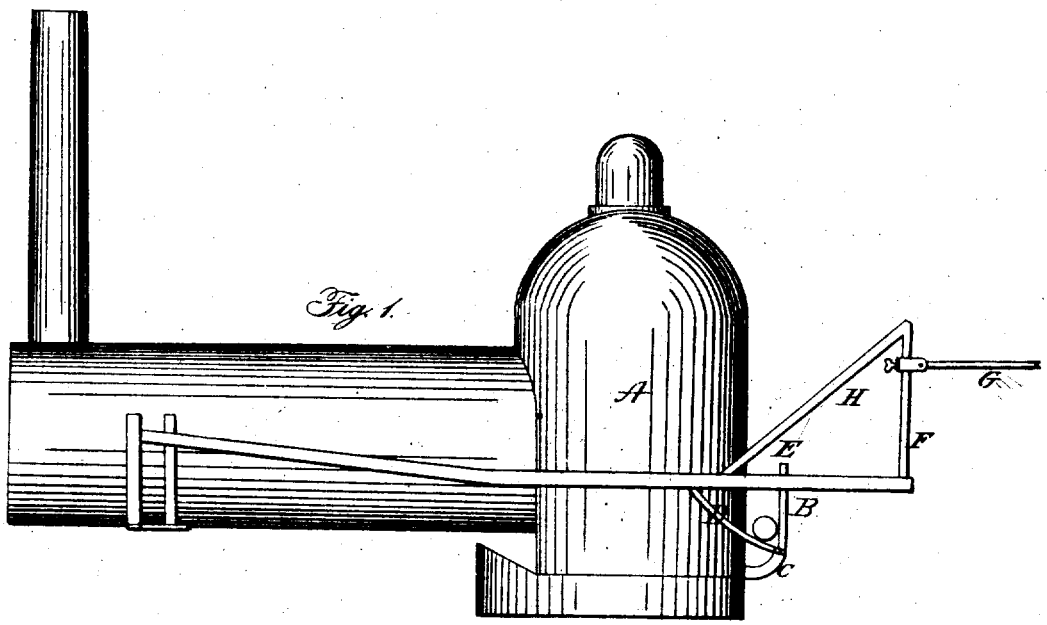

The Schedule referred to in these Letters Patent and making part of the same containing a description in the words of the said Charles Sellers and George Escol Sellers themselves of their improvement in the construction of Locomotive Engines To all whom it may concern. Be it known that We Charles Sellers and George Escol Sellers of the City of Philadelphia and State of Pennsylvania, have invented a mode of increasing the adhesion of the hind or working wheels in Locomotive Engines to the rails, whereby they are enabled to draw trains of Cars upon ascending tracks in situations where, without this improvement they would revolve on the rails without advancing. and we do hereby declare that the following is a full and exact description thereof. The principal upon which we proceed in increasing the adhesion to the rails of a Rail Road, of the hind or working wheels of a Locomotive Engine, is the so coupling the ^connecting^ Cars containing the load to be drawn to the body of the Locomotive Engine as that the load by its action upon a lever or standard shall tend to raise the fore end of the Locomotive in any desired degree, and thus to lessen the pressure upon the fore, and transfer the same to the hind wheels. The arrangement of the parts by which the end may be attained, is capable of much variation, but the principal will be rendered evident by reference to the accompanying drawings. in which fig 1. represents a side view. and fig 2. a plan of so much of the Locomotive Engine and frame work as is necessary for the present description. The wheels of the Locomotive are not shown, as they would obstruct the view of the parts particularly to be spoken of. A. is the furnace part of the body of the Locomotive. B is a lever or standard attached or not at its lower end C to the body of the furnace and strengthened and sustained by the braces D. from the upper end E. of the lever a [illegible] or other contrivance is to extend to the first of the train of Cars. Instead of attaching the lever or standard to the body of the furnace it may be attached to frame by which it is sustained as shown at F upon which a jointed rod G to be con-
nected to the car, may be made to slide up or down so as to increase
or decrease ... the leverage. H is a brace to F. having thus fully ex-
emplified the principle of our said Invention, we wish it to be dis-
tinctly understood that we do not intend to limit ourselves to any
particular form or manner of constructing the parts concerned, in
producing the intended effect, but what we claim as our inventi-
on and wish to secure by Letters Patent, is the connecting to a Locomotive
Engine the load to be drawn by it in such a manner as to throw
a larger portion of the weight of the Locomotive upon its hind wheels,
than they are ordinarily intended to sustain, on the manner or up
on the principle herein before set forth.

Exd Witnesses
[illegible] Peale
Jos. Hayes.

Chas. Sellers
Geo. Escol Sellers (Drawing) (602 words)